(12) United States Patent
Hennessy et al.

(10) Patent No.: US 12,202,038 B2
(45) Date of Patent: Jan. 21, 2025

(54) DEVICE FOR MARKING A MOULDED OR CAST FORM

(71) Applicant: UNIVERSITY OF LIMERICK, Limerick (IE)

(72) Inventors: Jennifer Hennessy, Cratloe (IE); John Harris, Keenagh (IE); Mark Southern, Limerick (IE)

(73) Assignee: University of Limerick, Limerick (IE)

( * ) Notice: Subject to any disclaimer, the term of this patent is extended or adjusted under 35 U.S.C. 154(b) by 888 days.

(21) Appl. No.: 17/054,117

(22) PCT Filed: May 14, 2019

(86) PCT No.: PCT/EP2019/062354
§ 371 (c)(1),
(2) Date: Nov. 9, 2020

(87) PCT Pub. No.: WO2019/201968
PCT Pub. Date: Nov. 21, 2019

(65) Prior Publication Data
US 2021/0114088 A1   Apr. 22, 2021

(30) Foreign Application Priority Data

May 15, 2018 (EP) .................................... 18172490

(51) Int. Cl.
*B22D 17/22* (2006.01)
*B22C 23/00* (2006.01)
(Continued)

(52) U.S. Cl.
CPC .......... *B22D 17/2245* (2013.01); *B22C 23/00* (2013.01); *B29C 33/428* (2013.01); *B29C 45/374* (2013.01)

(58) Field of Classification Search
CPC ... B22C 23/00; B22D 17/2245; B29C 33/428; B29C 45/374; B29C 33/424; B29C 2037/80; F03G 7/06
See application file for complete search history.

(56) References Cited

U.S. PATENT DOCUMENTS 3,500,634 A * 3/1970 Buiting .............. G05D 23/1921
60/528
3,696,611 A * 10/1972 Noakes ..................... F03G 7/06
60/527
(Continued)

FOREIGN PATENT DOCUMENTS

DE   202011108698 U1   1/2012
DE   102015215318 A1   2/2017
(Continued)

OTHER PUBLICATIONS

"Printed Circuit Board," 2018, Wikipedia (Year: 2018).*
(Continued)

*Primary Examiner* — John J DeRusso
*Assistant Examiner* — Victoria Bartlett
(74) *Attorney, Agent, or Firm* — Anthony G. Smyth; LOZA & LOZA, LLP

(57) ABSTRACT

A method and apparatus for real-time in-mould marking of a moulded or cast form with an identifier in which a configurable marking module (1) with phase change actuators (23) in the form of a multi-layered printed circuit board assembly (1) with a vertical element (33) having a marker (21) is installed in a mould (2), (35), the marker (21) being remotely configurable by a controller to create a unique identifier which is applied to the form in the mould.

21 Claims, 6 Drawing Sheets

(51) Int. Cl.
*B29C 33/42* (2006.01)
*B29C 45/37* (2006.01)

(56) References Cited

U.S. PATENT DOCUMENTS

| | | | |
|---|---|---|---|
| 4,342,549 A * | 8/1982 | Lemelson | B29C 45/374 425/185 |
| 2005/0122194 A1* | 6/2005 | Hintz | F03G 7/06 335/220 |
| 2015/0125271 A1* | 5/2015 | Conrad | F16J 15/008 277/545 |
| 2019/0047198 A1* | 2/2019 | Alemany Negrete | B29C 45/045 |

FOREIGN PATENT DOCUMENTS

| EP | 2543882 A1 | 1/2013 |
|---|---|---|
| EP | 2543883 A1 | 1/2013 |
| GB | 1503164 A | 3/1978 |

OTHER PUBLICATIONS

PCT/EP2019/062354. International Search Report & Written Opinion. (Jul. 29, 2019).

Vedel-Smith et al. "Casting traceability with direct part marking using reconfigurable pin-type tooling based on paraffin-graphite actuators." Journal of Manufacturing Systems, vol. 31, Issue 2, pp. 113-120 (Apr. 2012).

\* cited by examiner

DEVICE FOR MARKING A MOULDED OR CAST FORM

CLAIM OF PRIORITY

This application is the U.S. National Stage of International Patent Application No. PCT/EP2019/062354 filed May 14, 2019, which claims priority to European Patent Application No. 18172490.7 filed May 15, 2018, both of which applications are incorporated herein by reference in their entirety.

INTRODUCTION

This invention relates to a device for marking a moulded or cast form and more particularly to a device for in-mould marking of a moulded or cast form with patterning such as an identifier.

BACKGROUND

Moulding and casting are processes widely used in industry for the manufacture of products ranging from plastics household goods to metal and alloy medical devices. There are a number of different well known moulding techniques for manufacturing articles. One common moulding technique involves shaping liquid or pliable raw materials using a mould made with a CAD model of the final article. Casting is a manufacturing process in which a molten material, typically metal, is injected or poured into a mould to form an article which is then removed from the mould to complete the process. In sand casting, the article is broken out of its mould while in investment casting a fugitive wax article is removed from a reusable mould (containing the marking technology). This fugitive wax article is then dipped in slurries to make a fugitive mould. The fugitive wax article is then melted out of the fugitive mould and the fugitive mould is then filled with molten metal. When this metal solidifies, the fugitive mould is broken away from the metal article akin to sand casting. The investment casting process is an established technology for the manufacture of near net shape castings and the process is widely used to manufacture sophisticated products such as medical devices, aerospace components, automotive parts and power generation equipment which demand traceability.

Both moulding and casting processes therefore employ moulds or dies and, unless stated otherwise, moulding and casting processes shall hereinafter be referred to collectively as moulding processes and moulds and dies shall be referred to collectively as moulds.

Despite technological advances, moulding processes suffer from a number of disadvantages. For example, it is often necessary or desirable to mark a moulded product with patterning such as markings, identifiers and the like. In particular, in the manufacture of sophisticated and highly engineered products it is desirable, and sometimes necessary, for the final product to be traceable via an identifier to the mould from which it originated for quality and safety reasons.

However, up to now it has not been possible to automatically trace products back to the point of the initial wax pattern mould from which the product originated in an effective and repeatable manner. For example, conventional identifiers such as non-intrusive (additive) markings (e.g. inks and labels) are not suitable for medical device implants and, in any event, cannot be used to trace implants to the wax pattern stage. Accordingly, Direct Part Marking (DPM) must be employed. However, due to the risk of structural damage and the loss of traceability from the mould used in the manufacture of the wax pattern, DPM must be effected by marking the wax pattern so that the marking becomes integral to the final product. As described in U.S. Pat. No. 6,582,197, this can be achieved by applying a pre-formed wax/plastic token or stencil that already bears a pre-determined identifying mark to the already formed wax pattern or by engraving the wax pattern directly. Tokens can also be manually inserted into a mould so that the token pattern becomes integral to the casted part (wax or otherwise). However, the correct stencils or tokens must be placed on the wax pattern and errors can easily arise where the incorrect stencil or token is used while the manual application of wax tokens with a unique identifier to the moulded wax pattern is labour intensive, time consuming and also prone to error. Furthermore, as these methods are not easily and automatically controllable, it is difficult to guarantee the serial identification of parts.

It is also known to employ configurable marker modules in moulds in which mechanical or phase change actuators in the marker modules create identifiers. However, the moving components in mechanical actuators can be unreliable and also mitigate against compact actuator design making the mechanical actuators unsuitable for identifying small products.

Phase change actuators employ phase change materials that undergo a volume change to create a marking on a product when a characteristic threshold temperature is reached (the transition temperature) and the material undergoes a phase transformation. The absence of moving mechanical parts allows for a compact and reliable actuator design. Nevertheless, known phase change actuators also suffer from a number of disadvantages. For example, each phase change actuator must be heated by a heating element in order to effect a phase change of the phase change material within the actuator. However, known heating elements can increase the pitch between adjacent actuators to limit the number of phase change actuators that can be employed in the marker module thereby limiting the type and number of identifiers that can be generated by the module. Moreover, in order to enhance resistive heating and the phase change of the phase change material, which is typically wax, the phase change material must be loaded with electrically conductive materials such as graphene or carbon and the like. These electrically conductive materials can settle out of the phase change material over time and thus compromise performance while the presence of the electrically conductive materials in the phase change materials reduces the volume change at phase transformation as these materials do not expand/contract at the transition temperature.

SUMMARY

According to the invention there is provided a device for marking a moulded form with patterning comprising:
  a marking module locatable in a mould;
  a phase change actuator containing a phase change material in the marking module, and
  a heating element for heating the phase change material wherein the heating element comprises a vertical heating element, wherein the vertical heating element envelops the phase change material.

Preferably, the vertical heating element comprises a sleeve. More preferably, the sleeve comprises a substantially cylindrical sleeve.

Preferably, the vertical heating element comprises a resistive heating element. More preferably, the resistive heating element comprises a cured carbon/polymer material.

Alternatively, the vertical heating element comprises a coil.

In one embodiment, the device further comprises a vertical heat conductor.

Preferably, the phase change material comprises a pure unloaded phase change material.

In a preferred embodiment, the marking module is a multi-layered printed circuit board assembly.

Preferably, the multi-layered printed circuit board assembly comprises electrodes for the vertical heating element.

Suitably, the multi-layered printed circuit board assembly comprises electrical conductors for the electrodes.

Preferably, the phase change actuator comprises a protective membrane over the phase change actuator. More preferably, the protective membrane comprises an elastomeric or polymeric material. Most preferably, the elastomeric or polymeric material comprises a room temperature vulcanising silicone adhesive.

In one embodiment, the device further comprises a controller communicable with the marking module.

Preferably, the controller is wirelessly communicable with the marking module. More preferably, the controller is wirelessly communicable with the marking module via a hardware interface.

Alternatively, the controller is wired to the marking module.

Optionally, the marking module further comprises a mould recogniser to recognise individual moulds. Preferably, the mould recogniser comprises a key on the marking module responsive to the mould. More preferably, the mould recogniser comprises at least one switch on the marking module responsive to a key on the mould.

Suitably, the mould recogniser comprises an RFID chip reader on the marking module responsive to an RFID chip on the mould.

According to another embodiment of the invention there is provided a device for marking a moulded form with patterning comprising:
  a marking module locatable in a mould;
  a phase change actuator containing a phase change material in the marking module, and
  a heating element for heating the phase change material wherein the heating element comprises a vertical heating element.

The invention therefore provides a method for marking a moulded or cast form employing a configurable and more especially a reconfigurable marking module which is incorporated into a mould wall and which can be automatically driven to mould a series of unique identifiers into forms produced from the mould. Each unique identifier is applied during the moulding process with no operator intervention. The method and apparatus of the invention therefore enables the creation of a dynamic surface on mould walls for all moulding and casting processes.

The use of vertical heating elements such as heater sleeves obviates the need for suspending/blending electrically-conductive carbon/graphite particles in the phase-change material, and so a pure phase-change material can be used instead. A stable and repeatable performance is achieved because the problem of suspended/blended particles settling out of the phase-change material is avoided. The vertical heating elements/heater sleeves are solid-state components and are therefore as robust as any conventional electronic component. The phase-change material is sealed inside the chamber and therefore cannot degrade by interacting with the external environment.

The heating elements also uniformly deliver power to the entire bulk of the phase-change material at one instant leading to very fast and repeatable actuation response times.

Moreover, the phase change actuators of the invention fully utilise the expansion capacity of the phase-change material, leading to reduced quantities for a given required actuation travel, compared to phase-change materials loaded with suspended/blended particles. Accordingly, for identical quantities of heat energy delivered to two actuator cells of identical dimensions and under otherwise identical environmental conditions, the actuators of the invention containing the pure phase-change material exhibit a greater travel than the actuators of the prior art containing loaded phase-change materials.

The vertical nature of the resistive heater sleeve also allows for higher array densities. This is especially advantageous for applications requiring for example a 2D Data Matrix marking in a small footprint. The high densities ensure that the maximum allowed pitch between cells is not breached in such applications.

The marking module can be automatically driven/commanded and, if desired, can recognise the mould into which it is inserted whilst providing for real-time in-situ generation and creation of unique identifiers during moulding processes. The unique identifier can optionally include information on originating moulds and dies due to its mould recognition capacity.

The inherent traceability afforded by the invention adds value to cast or moulded forms. The identifiers marked on the forms are integral to the finished form and are therefore indelible. Unique identifier codes can be employed to provide for life-time traceability and can be used for auditing and other purposes. For example, a surgeon implanting an artificial joint cast marked using the device of the invention can scan the identifier code and map it to the patient's details in a database for quality and traceability purposes—and to facilitate potential recalls. Similarly, a service engineer can scan identifier codes marked on a cast jet engine turbine blade in accordance with the method of the invention for auditing and safety purposes.

When implemented in investment casting processes, the device of the invention eliminates the requirement for manual placement of identification tokens on the wax pattern or onto an inner mould face. The device of the invention is also fully-automated allowing for reduced cycle times and labour intensity. Complete traceability of each form back to its originating mould is possible, e.g. the wax pattern mould in investment casting, resulting in the significantly reduced possibility of incorrect identification of a wax pattern.

BRIEF DESCRIPTION OF THE DRAWINGS

The invention will now be described, by way of example only, with reference to the accompanying drawings in which.

DETAILED DESCRIPTION OF THE INVENTION

Figure 1:
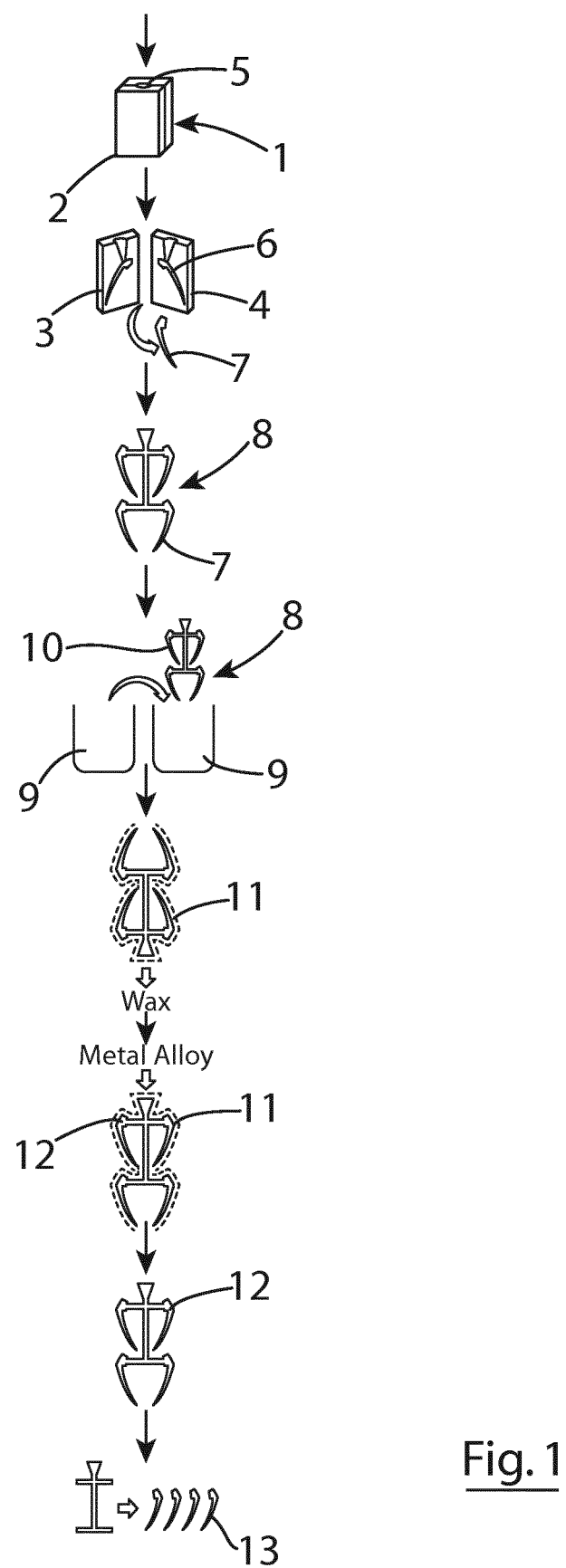
FIG. 1 is a schematic representation of an investment casting process for marking a moulded form with a unique identifier using an in-mould dynamic reconfigurable marking module device of the invention made up of a multi-layered printed circuit board (PCB) assembly in which the mould is the fugitive or wax pattern mould in the investment casting process—the unique identifier then being transferred to the casting mould and the casting to enable tracing of the casting to the wax pattern mould.

FIG. 1 of the drawings describes an investment casting process employing an in-mould dynamic reconfigurable marking module device of the invention for uniquely marking a casting resulting from the investment casting process with a unique identifier to allow traceability of products manufactured using the process. However, although the following description describes the in-mould marking module device of the invention for use in creating unique identifiers, as will be appreciated by those skilled in the art, the device can be also used for creating other in-mould patterning as required. Accordingly, the invention should not be construed as being limited to the creation of unique identifiers only.

As shown in the drawing, a dynamic reconfigurable marking module device 1 of the invention in the form of a multi-layered printed circuit board (PCB) assembly 1 is pre-installed in a fugitive, typically wax, pattern mould 2 manufactured by a toolmaker. For moulding purposes, the mould 2 is of generally conventional construction and in the embodiment shown is made up of a mould first part 3 and a mould second part 4 attached to the mould first part 3 to define an opening 5 and a cavity 6 between the mould first and second parts 3,4. It will however be appreciated that the mould could be made up of any number of parts. The cavity 6 is shaped and dimensioned to define a wax pattern 7.

As shall be explained more fully below, the multi-layered PCB assembly 1 is configured to define a desired identifier code on the wax pattern just before wax is injected into the mould 2. The multi-layered PCB assembly 1 is incorporated into the mould wall of the cavity 6 to be in direct contact with the injected wax. The multi-layered PCB assembly 1 can be placed in any section of the mould cavity 6 so that any accessible face of the wax pattern 7, and hence the final casting from the investment casting process, can be marked with an identifier as required.

Wax is then either poured or injected into the mould 2 via the opening 5. The wax is then allowed to solidify and conform to the shape of the cavity 6—and to the previously configured identifier code defined by the marking module 1.

Several wax patterns 7 can be formed and removed from their respective moulds 2 (each provided with a multi-layered PCB assembly 1) and assembled onto a wax sprue to form a wax tree 8.

This wax tree 8 is then dipped or "invested" in a series of liquid ceramic slurries 9 of successively increasing particle size, with intermediate draining and drying steps to grow a refractory coating 10 around the wax tree 8. The refractory coating 10 is then coated in dry "stucco" sand. The particle size of the initial slurries 9 is finest to allow the inner refractory coating 10 to faithfully conform to the finest shapes and patterns in the wax tree 8—including the unique identifier code. Progressively coarser particles are used in succeeding layers of slurries 9 to confer mechanical strength on the refractory coating 10. Typical refractory coating thicknesses range from 5 mm to 12 mm.

A temperature-treatment process is then employed to melt the wax tree 8 so that the wax flows from the refractory coating 10 for subsequent recycling. The refractory coating 10 is also fired at this stage to fuse ceramic particles in the refractory coating 10 and form a shell-like ceramic casting mould 11 corresponding with the original wax tree 8. The ceramic casting mould 11 can withstand the pressure and temperature of molten metal while the firing also ensures removal of all traces of organic materials.

Heat treatment is then continued, to allow molten metal to be poured into the casting mould 11 to form a metal tree casting 12 also corresponding with the original wax tree 8. After cooling, the casting mould 11 is mechanically and chemically removed from the metal tree casting 12 and the resulting metal forms 13 (e.g. artificial joints, medical devices and the like) bearing the unique in-mould identifier codes from their respective wax patterns 7 are then mechanically separated from the metal tree casting 12.

In summary, the unique identifier code created in the wax pattern mould 2 is transferred to each wax pattern 7 which is in turn transferred to the casting mould 11 formed from the wax pattern 7 to find itself on the metal form 13.

FIGS. 2 to 5 show the in-mould multi-layered PCB assembly 1 described in FIG. 1 in more detail. As shown particularly in FIG. 2, the multi-layered PCB assembly 1 is made up of a module block 14 having a substantially square bottom face 15 and first, second, third and fourth sidewalls 16,17,18,19 respectively upstanding therefrom to a top marking surface 20. The top marking surface 20 comprises a marker 21 for imparting identifiers or patterning to forms (the wax pattern 7 in the embodiment of the method of the invention described in FIG. 1).

The marker 21 is made up of a matrix or array 22 of phase change actuators 23 housed in cells 24 defined in the multi-layered PCB assembly 1 which can be automatically moved between an expanded volume (extended) position from the cells 24 and a contracted volume (retracted) position in the cells 24 by means of volumetric expansion and contraction of a phase change material 25 contained in the cells 24 during a change of phase from a solid to a liquid and vice versa to form identifier codes at the top marking surface 20. The cells 24 can be of any desired number and cross-sectional shape e.g. round or square to create the desired identifier code or patterning.

As discussed in more detail below, a phase change from a solid to a liquid is achieved by heating the phase change material over its solidification temperature.

Figure 2:
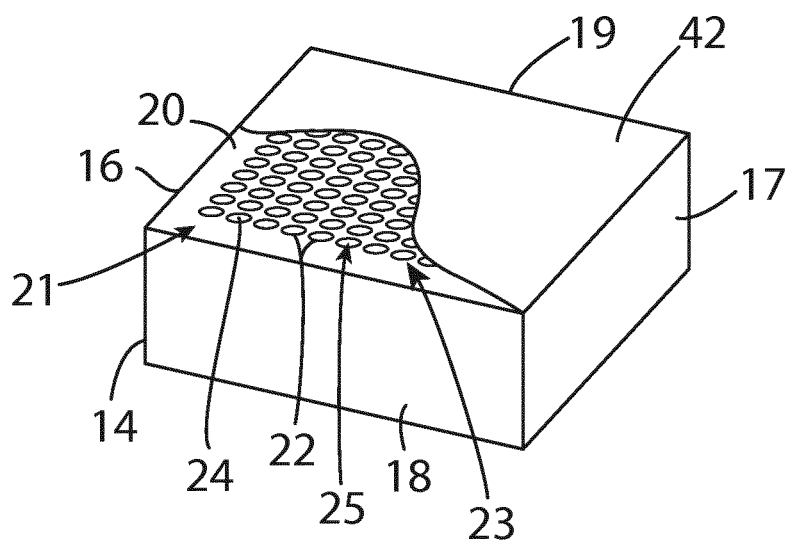
FIG. 2 is a perspective view from above and one side of the multi-layered PCB assembly of the in-mould marking module with the displacement mechanism in the form of a protective displacement membrane on the module partially removed from the marking surface of the module to reveal an array or matrix of phase change actuators on the marking surface.
Figure 3:
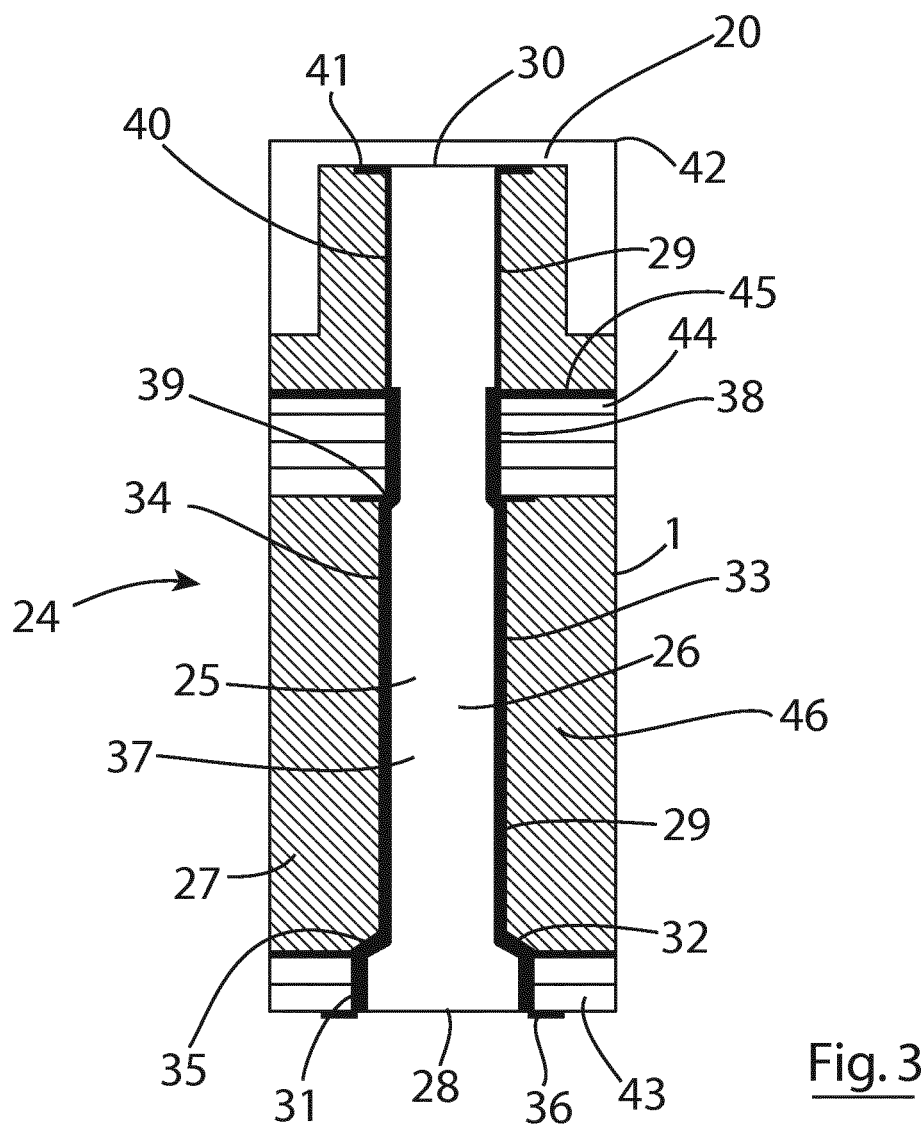
FIG. 3 is an enlarged cross-sectional view through a single phase change actuator of the array of the multi-layered PCB assembly of FIG. 2 in which the phase change actuator is made up of a cell for the phase change material surrounded by a vertical heating element in the form of an integrated back-drilled electrode sleeve, isolation and insulation layers and the flexible displacement membrane on the cell.

FIG. 3 shows an enlarged cross-sectional view through a single phase change actuator cell 24 of the array 22 of phase change actuators 23 of the multi-layered PCB assembly 1 of FIG. 2. As shown in the drawing, the single actuator cell 24 is made up of a vertical tubular or cylindrical chamber 26 for containing the phase change material 25 defined in the multi-layered PCB assembly 1. More particularly, the chamber 26 is formed in the structure of the multi-layered PCB assembly 1 such as a block of FR4 material 27. The cylindrical chamber 26 is defined by a relatively long vertical axis and a shorter horizontal axis and has a circular bottom 28 and a vertical sidewall 29 upstanding from the circular bottom defined in the FR4 material 27. The vertical sidewall 29 terminates at an upper opening 30 at the top marking surface 20 of the actuator cell 24. The vertical sidewall 29 is further contoured to define a chamber wider portion 31 beneath a sidewall shoulder 32 defined in the sidewall 29 towards the circular bottom 28.

The actuator cell 24 is provided with a vertical heating element 33 for heating the phase change material 25 disposed substantially parallel with the vertical axis of the cylindrical chamber 26. In the present embodiment, the vertical heating element 33 is a resistive heater sleeve 33 sized and shaped to be contiguous with the vertical sidewall 29 of the cylindrical chamber 26 so that the resistive heater sleeve 33 envelops the phase change material 25. More particularly, the resistive heater sleeve 33 is also substantially cylindrical in shape and is defined by a resistive heater sleeve vertical sidewall 34 shaped to have a resistive heater sleeve lower shoulder 35 complementary with the shoulder 32 of the chamber 26 to in turn define a resistive heater sleeve lower portion 36 around the wider portion 31 of the chamber 26. A resistive heater sleeve intermediate portion 37 extends upwards from the resistive sleeve lower portion 36 and terminates at a narrowed resistive heater upper portion 38 spaced from the vertical sidewall 29 of the chamber 29 at an upper shoulder 39 defined in the resistive heater sleeve vertical sidewall 34.

The resistive heater sleeve 33 of the present embodiment can be formed by backdrilling and is made up of a cured carbon/polymer material such as carbon black based polymer placed in the multi-layered PCB assembly 1 after backdrilling. More particularly, the carbon black based polymer effectively coats the vertical sidewall 29 of the chamber 26 in the PCB assembly 1 and is heat-cured in situ so that the heater sleeve 33 is a solid state heater sleeve with a resistance that remains stable during operation. Other suitable materials for the heater sleeve include semiconducting metal oxides, metals, insulating oxides, and other such materials or blends thereof capable of providing the desired electrical resistance.

The use of the heater sleeve 33 obviates the need for suspending/blending carbon/graphite particles in wax so a pure wax can be used instead. The pure wax combined with the heater sleeve 33 therefore realises the stable, reliable and repeatable properties required during heating.

The heater sleeve 33 can be formulated to the desired resistance value by mixing a conductive carbon black loaded paste with a dielectric. The ratio of conductor to dielectric will dictate the resistance of the heater sleeve 33 in the PCB assembly 1. Once cured, the resistance of the heater sleeve 33 material does not change during operation.

As indicated above, phase change actuators of the prior art are plagued with either slow response times (in the case of meandering planar heaters) and/or unpredictable/variable response times (in the case of carbon/graphite blends)—in the former case, the thermal insulation properties of wax makes it difficult for planar heater power to drive the melting phase while in the latter case, the aforementioned variability issues cause a concomitant variation in actuation response. In contradistinction, the vertical heater element or sleeve 33 envelops the phase change material 25 to generate a stable and repeatable heat profile and to uniformly deliver power to the entire bulk of the phase change material at one instant, leading to very fast and repeatable response times.

The actuator cell 24 is also provided with a vertical heat conductor 40 for coupling heat between the vertical heater element 33 and the opening 30 at the top of the chamber 26 by means of thermal conduction to heat the phase change material 25. The vertical heat conductor 40 is also contiguous with the vertical sidewall 29 of the chamber 26. In the present embodiment, the heat conductor 40 is a sleeve 40 which is disposed between the narrowed resistive heater upper portion 38 and the vertical sidewall 29 and extends around the opening 30 at a conductor ring portion 41.

The top marking surface 20 of the cell 24 (and of the multi-layered PCB assembly 1 of FIG. 2 where an array 22 of cells 24 is employed) is provided with a displacement mechanism in the form of a resilient protective membrane 42 that is displaced by the phase change material 25 during phase transition to emboss and deboss the wax pattern 7. The protective membrane 42 also serves to contain the phase change material 25 in the chamber 26.

The protective membrane 42 comprises an elastomeric or polymeric material adapted to seal the openings 30 on the top marking surface 20 at the mould/form interface. The membrane 42 can be secured to the cell 24 using a number of methods such as an adhesive applied to the top marking surface 20 or by an adhesive or clamp applied at the sidewalls 16,17,18,19 of the module block 14. In addition, a room temperature vulcanising (RTV) silicone adhesive can be employed to form the membrane 30. The RTV silicone adhesive is a viscous liquid that cures into the flexible membrane 42 when spread thinly over the top marking surface 20 of the module block 14.

The cell 24 is further provided with a common signal ground and an optional thermal Peltier interface 43 adjacent the resistive heater sleeve lower portion 36 and electrode sleeve connectors 44 adjacent the heat conductor 40 while a thermal plane 45 is also provided at the heat conductor 40.

Where multiple cells 24 are employed in an array 22 in a multi-layered PCB assembly 1 as shown in FIG. 2, the (FR4) material of the PCB assembly 1 also serves as an insulating layer 46 between the cells 24 to ensure optimal individual performance of the cells 24 in the array 22.

In one embodiment of the invention, the phase change material 25 comprises paraffin wax. However, any other suitable phase change material 25 could equally well be used.

Figure 4:
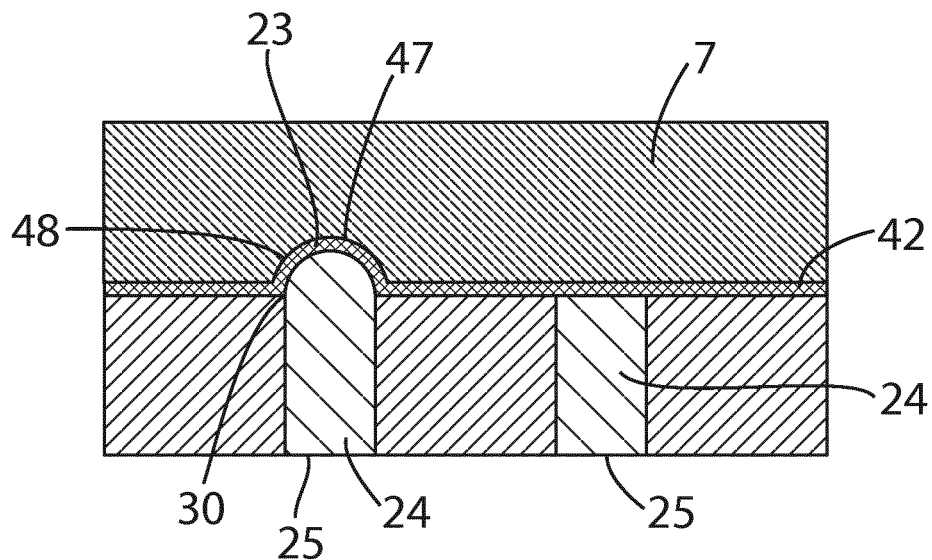
FIG. 4 is an enlarged cross-sectional view through a portion of two actuator cells of the PCB assembly of FIG. 2 in the mould in contact with the wax pattern with one phase change actuator protruding from its cell to displace the membrane to form a debossed unique identifier code on the wax pattern which is then transferred to the casting.

FIG. 4 shows an enlarged cross-sectional view through a portion of two actuator cells 24 of the PCB assembly 1 of FIG. 2 in the mould 2 in contact with the wax pattern 7 with one phase change actuator 23 protruding from its cell 24 to displace the flexible membrane 42 and form a debossed unique identifier code 47 on the wax pattern 7 which is then transferred to the casting 11. More particularly, where a phase change actuator 23 is commanded to move from its solid state in a position located flush with the wall of the mould 2 to expand or protrude from its opening 30 as indicated by the reference numeral 48, the debossed identifier code (or patterning) 47 is imparted to the wax pattern 7. This is achieved by elevating the temperature of the phase change material 25 above its solidification temperature with the vertical heating elements 33,40 such that it experiences a volumetric expansion as it changes from a solid to a liquid.

Figure 5:
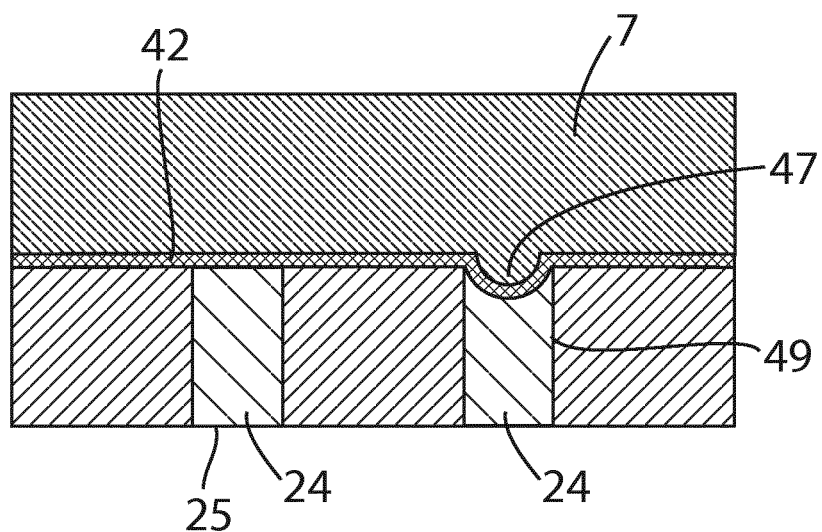
FIG. 5 is an enlarged cross-sectional view through a portion of two actuator cells of the PCB assembly of FIG. 2 in the mould in contact with the wax pattern with one phase change actuator recessed in its cell to form an embossed unique identifier code on the wax pattern which is then transferred to the casting.

FIG. 5 shows an enlarged cross-sectional view through a portion of two actuator cells 24 of the PCB assembly 1 of FIG. 2 in the mould 2 in contact with the wax pattern 7 with one phase change actuator 23 contracted or recessed in its cell 24 to form an embossed unique identifier code 47 on the wax pattern 7 which is then transferred to the casting 11. More particularly, where a phase change actuator 23 is commanded to move from its liquid state in a position located flush with the wall of the mould 2 to retract or contract into its opening as indicated by the reference numeral 49, an embossed identifier pattern or code 29 is imparted to the wax pattern 7. This is achieved by reducing the temperature of the phase change material 25 to at least its solidification temperature such that it experiences a volumetric reduction as it changes from a liquid to a solid.

Accordingly, in use, the pressure exerted on the membrane 42 during injection or pouring is sufficient to conform the membrane 42 around a protrusion 48 or into a recess or dimple 49 thus creating the desired identifier code or pattern on a form.

The cellular multi-layered PCB assembly 1 of the invention serves multiple functions by:
a) providing integrated chambers 26 for holding the phase-change material 25 (e.g. wax);
b) providing vertical heater elements/sleeves 33, 40 in the chambers 26;
c) incorporating electrodes as required for the heater elements/sleeves 33,40;
d) incorporating electrical conductors (traces) to route signals to/from the electrodes;
e) acting as a substrate/anchor that holds the flexible membrane 42 at the top marking surface 20 to seal and confine the phase change material in its chamber 26 both in the actuated (expanded volume) and unactuated (contracted volume) states;
f) optionally acting as a substrate onto which a sealant can be affixed at the bottom 28 of the chamber 26 to seal the phase-change material 25 into its chamber 26 at the bottom 28. In an alternative embodiment, the bottom 28 of the chamber 26 can be sealed by clamping a sealing material by mechanical or similar means at the bottom 28;
g) providing structural integrity for the actuator 23 or actuator array 22 as a whole;
h) optionally fulfilling other functions normally associated with PCB's e.g. holding electronic components, connectors, etc.

The absence of moving mechanical parts allows for a compact and reliable actuator design. All that is required is a temperature change about the transition point of the phase change material 25 to trigger a volumetric transition. The temperature change is provided by means of the vertical heating element 33 in the form of a heater sleeve 33 positioned in close proximity to the phase-change material 25—in the embodiment described above in the chamber 26. The heating element 33 can take many forms. However, an electrically-resistive heating element 33 such as a resistor or resistive element is preferred to form an electric/electronic heater. Accordingly, in this arrangement, the well-known phenomenon of Joule Heating is exploited by the invention for the heating element 33.

For a given mass of suitable phase-change material 25 of known density, heat capacity, and heat of fusion, and which is in solid form at a given starting temperature, sufficient energy (Joules of heat) must be provided to elevate the temperature of that material to its transition temperature. Additional energy is then necessary to complete the phase transition. The time required to achieve the transition is inversely proportional to the applied power, P, such that for said starting temperature, the overall actuation response time to a first approximation (ignoring losses) is halved if P is doubled and vice versa. Energy must continually be supplied to sustain the transition (by overcoming thermal losses). If the ambient temperature is below the transition temperature, then the heater sleeve 33 can be switched off to allow the phase-change material 25 to cool down to a temperature below that of its transition point, to reverse the actuation process. If the ambient temperature is greater than the transition temperature of the phase-change material 25, then that material must be actively cooled after the heater sleeve 33 is powered down. This can be achieved by means of thermal coupling to a refrigerant and/or a Peltier device 43 for example. If desired, active cooling can also be applied to reduce the response time of actuation reversal in the scenario where the ambient temperature is below the transition temperature of the phase-change material 25.

The heater sleeve 33 can be electrically energised in many ways including the following:
a) by applying a regulated or unregulated d.c. or a.c voltage. The instantaneous power dissipation of the heater sleeve 33 will then depend on its TCR (temperature coefficient of resistance) and its instantaneous operating temperature.
b) by supplying a regulated or unregulated d.c. or a.c. current. The instantaneous power dissipation of the heater sleeve 33 will then depend on its TCR and its instantaneous operating temperature.
c) by a combination of a) and b) such that the instantaneous power dissipation of the heater sleeve 33 remains constant and independent of its TCR and/or its instantaneous operating temperature.
d) The use of PWM (pulse-width modulation), burst control, or similar modulation/switching techniques with any of methods a), b), or c) above to further refine the level of control.

If desired, overall temperature regulation can be provided for the entire multi-layered PCB assembly 1. Overall temperature regulation provides a 'baseline temperature' for the PCB assembly 1 and the baseline temperature can be brought close to the transition temperature of the phase-change material 25 to minimise actuation response time. Temperature regulation can also be applied to set/reset actuator(s) 23 by temperature-cycling the phase-change material 25 through its transition point, while in an assembly 1 with multiple actuator cells 24 as shown in FIG. 2 overall temperature regulation helps to minimise thermal leakage between adjacent cells 24 by acting as a thermal sink. This effect can be augmented through the integration of thermally-conductive vias and planes within the PCB structure.

In one embodiment, a solid-state TEC (thermoelectric cooler or 'Peltier') device under the well-known PID (proportional-integral-derivative) control regime can be used. However, other methods can be used to regulate the baseline temperature (e.g. the use of a refrigerant system, combined with a discrete heater). However, a major benefit of using a TEC is that it can be used to both actively heat and actively cool the actuator assembly, simply by controlling the polarity of the electrical PID current as well as its magnitude. By using one or more embedded temperature sensors within the PCB structure, and/or by measuring the voltage across the TEC, it is relatively straightforward to set, monitor and maintain a baseline temperature. By using appropriate control electronics and software/firmware, it is then also possible to further enhance the level of control over actuator cells by dynamically adjusting the baseline temperature via the TEC or its equivalent.

As shown in FIG. 3, temperature regulation is typically applied towards the bottom 28 of the chamber 26. Thermal coupling can be applied directly to the bottom heater electrode(s) and/or to the intervening bottom-side areas between several such electrodes. These intervening areas can optionally be occupied by PCB vias or 'lands' that are directly connected to thermally-conductive conduits within the PCB that help to prevent excessive heat accumulation between adjacent actuator cells 24 for example.

The means of thermal coupling can follow normal practices in the art and can involve the use of thermal compounds/epoxies/pads, intervening heatsinks or thermal masses/couplers, clamps, etc., to ensure adequate thermal communication between the actuators 23 proper and the baseline temperature controller (e.g. TEC or equivalent described above).

Figure 6:
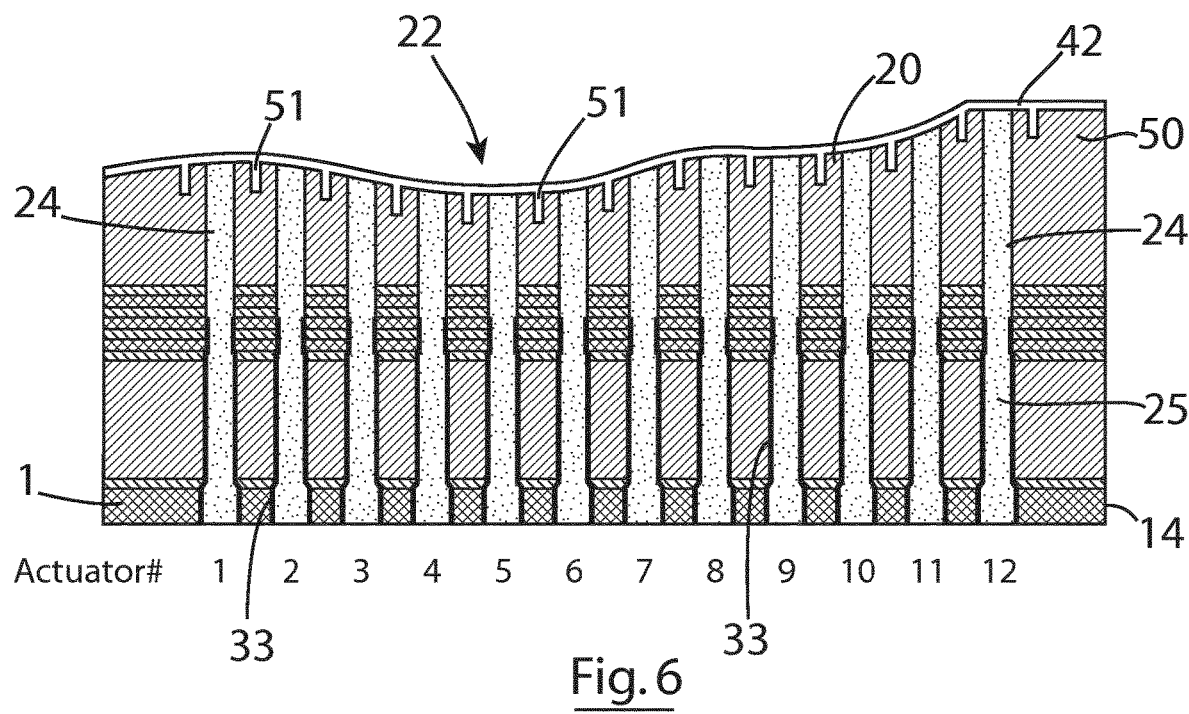
FIG. 6 is a cross-sectional view through a portion of a multi-layered PCB assembly (not to scale) having twelve adjacent phase-change actuators of FIG. 3 defined in the PCB assembly and membrane slots between each cell in which the top PCB layer has been machined to realise a curved array top surface.

FIG. 6 shows a cross-sectional view through a portion of a multi-layered PCB assembly 1 having twelve adjacent phase-change actuator cells 24 of FIG. 3 defined in the PCB assembly 1 in which a top PCB layer 50 has been machined to realise a curved array top marking surface 20 for marking forms with curved surfaces. Like numerals indicate like parts. The curved top marking surface can be formed prior to applying the membrane 42 to the top marking surface.

Where multiple phase-change actuator cells 24 are employed to create an array 22 as shown in the present embodiment, a single membrane 42 can be placed over the top marking surface 20 (see FIG. 2). However, if desired, each opening 30 of each cell 24 can be provided with an individual membrane 42 as shown in FIG. 3 to individually seal each chamber 26. In this arrangement, each membrane 42 is secured in a corresponding slot 51 defined between the cells 24. The slots 51 serve to increase the surface-area of adhesion between the membrane 42 and the PCB assembly 1—this is especially beneficial for densely-spaced actuator arrays 22 on which the available planar surface area for membrane 42 adhesion between cells 24 is minimal.

Figure 7:
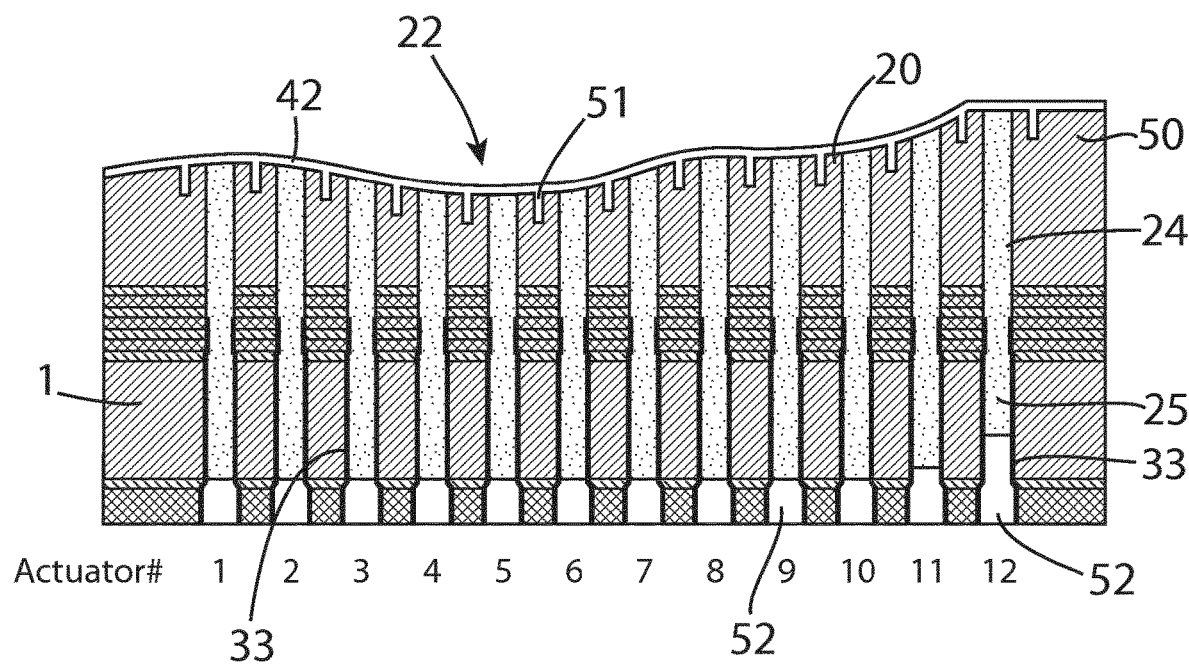
FIG. 7 is a cross-sectional view through a multi-layered PCB assembly of FIG. 6 in which the cells are each plugged to various depths towards the bottom to maintain identical wax volumes and therefore identical phase change material volume expansion with the location and height of the heater sleeves for cells 7 to 12 inclusive following the top surface curvature of the assembly.

As shown in FIG. 6, the volume of phase change material 25 in Actuator Cell No. 12 is greater than in Actuator Cell No. 4 due to the greater vertical length of Actuator Cell No. 12. Accordingly, for the same wax formulation across all cells 24, the volume expansion for an actuated phase-change state in Actuator Cell No. 12 will be proportionately greater than in Actuator Cell No. 4, leading to different embossing 'bump' heights. This difference will be negligible in many practical applications where the degree of curvature across the entire array is slight. However, in applications where the difference in bump height would be unacceptable, the cells 24 can be provided with a suitably dimensioned filler plug 52 as required at its bottom 28 as shown in FIG. 7. Each plug 52 is sized and dimensioned as required such that the volume of wax contained in all cells 24 is identical. Accordingly, in the embodiment shown in FIG. 7, the actuated volume expansion is identical for all cells 24 in the curved array 22. The depth of the chambers 26 and the height of the vertical heater sleeves 33 can also optionally be varied as shown in FIG. 7 (see Actuator Cell Nos. 7 to 12) to follow the contours of the curved top surface 20 such that heating power is delivered at similar depths for all cells 24. The cell 24 diameter and shape can also be varied across the array as outlined previously.

Figure 8:
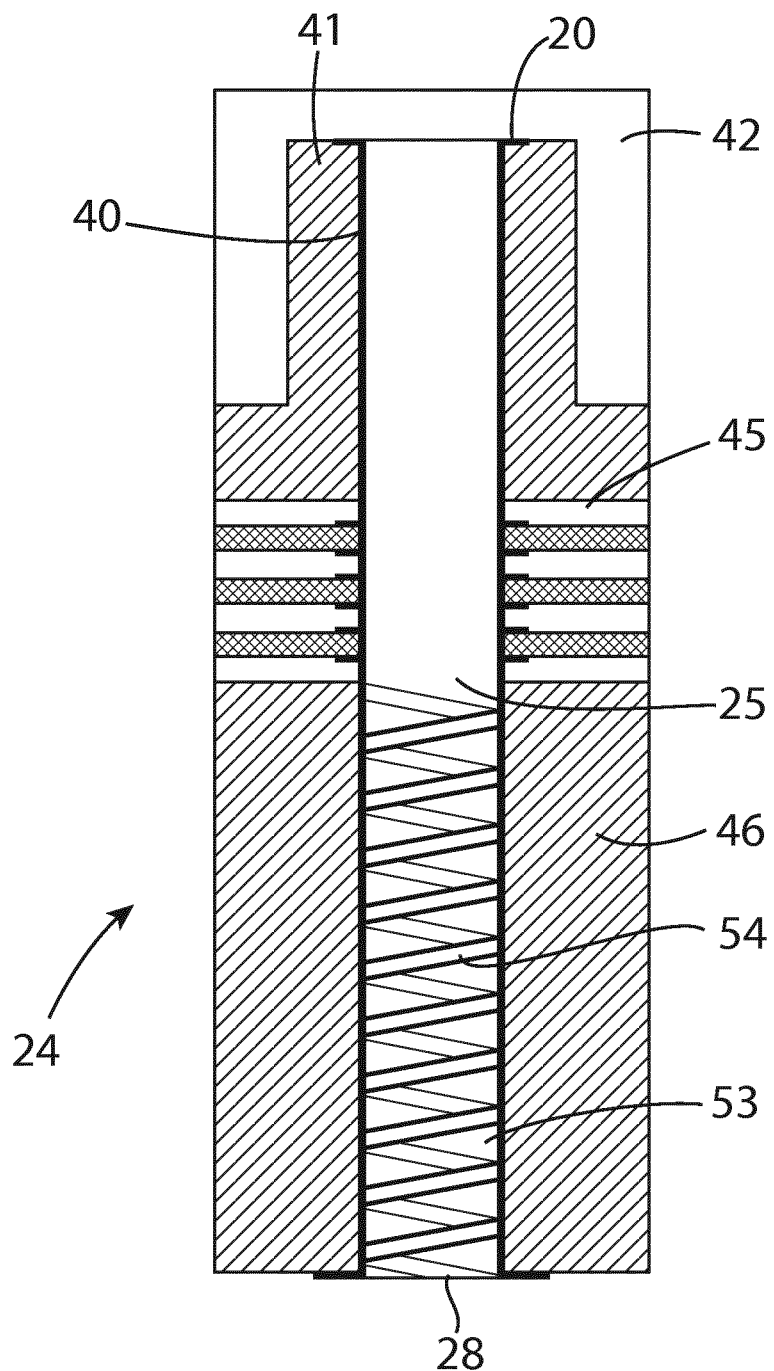
FIG. 8 is an enlarged cross-sectional view through an alternative embodiment of a single phase change actuator of the array of multi-layered PCB assembly in which the phase change actuator is made up of a cell for the phase change material surrounded by a vertical heating element in the form of an integrated coiled heater sleeve, isolation and insulation layers and the flexible membrane on the cell.

FIG. 8 shows an enlarged cross-sectional view through an alternative embodiment of a single phase change actuator cell 24 broadly similar to the actuator cell 24 of FIG. 3 and like numerals indicate like parts. However, in the present embodiment, the vertical heating sleeve 33 is replaced by an integrated and vertical resistive heater coil 54 in the chamber 26. In this embodiment, a coiled groove 53 is cut into the vertical sidewall 29 of the chamber 26 to form the heater coil 54 i.e. the act of cutting the coiled groove 53 in the sidewall 29 results in the formation of the resistive heater coil 54. Backdrilling is therefore not required and a suitable coil-cutting operation is instead performed.

Figure 9:
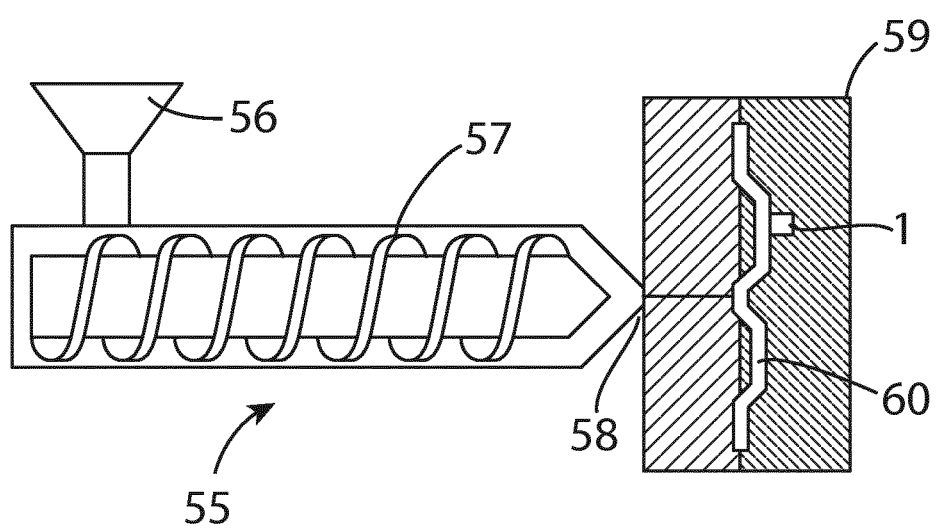
FIG. 9 is a schematic side elevation in partial cross-section of an injection moulding apparatus and die provided with a marking module of the invention for applying a unique identifier to injection moulded forms.

The invention can be employed across a range of moulding processes. FIG. 9 shows the device of the invention in use with an injection mould machine 55 having a hopper 56 for receiving plastics material and a screw 57 for conveying melted plastics to a nozzle 58 where the plastics is injected into an injection moulding die 59 having an injection moulding die cavity 60 provided with a marking module 1 of the invention as previously described. Accordingly, in this embodiment, the surface of a finished injection moulded form is directly marked by the marking module 1 with an identifier code.

For moulding applications, a phase-change actuation material 25 with a transition temperature higher than the injection temperature of the material being moulded can be used.

Similarly, during a sand casting process, the marking module 1 is located in the mould cavity at the wall of the mould so that when molten metal is poured into the mould, the resultant casting conforms to the identifier code at the marking module to mark the final form directly.

As indicated above, the device of the invention can be employed to impart patterning and identifier codes to each form produced from a single mould. Moreover, for processes that employ multiple single-cavity moulds and/or moulds with multiple cavities, the device of the invention allows for the identification of each individual mould cavity by a mould recogniser on the marking module 1 e.g. a mechanical keying of an ID code in each mould cavity that actuates a set of binary switches on the module block 14 of the marking module 1. For example, X switches gives 2× ID number combinations. The ID can then be read by control software and optionally encoded into the identifier code communicated to the marking module 1 for marking on the form in the mould. Alternatively, the ID can be logged to a file against each identifier code marked on the form by the marking module 1.

Alternatively, the module block 14 can be keyed so that the marking module 1 can only be inserted in one dedicated cavity. The block ID can then be stored in an embedded memory chip or assigned via software.

In a further embodiment, an RFID chip can be used in a mould cavity to relay its identity to a marking module 1 provided with an RFID reader.

In addition to the marking module 1, the device of the invention includes a marking system controller which determines how the marking module 1 is configured to create the required identifier code and a hardware interface to communicate the required identifier code to be marked on the form to the marking module 1.

The hardware interface can communicate with the marking module using wireless technologies known in the art.

The identifier code applied to forms can be of any type known in the art such as Data Matrix Codes, QR codes, MaxiCodes, Aztec Code, Code One, alphanumeric characters, barcodes, graphical images, braille text and the like. Alternatively, the marking controller can be programmed to generate bespoke identifier codes as required.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM or EPROM, a magnetic recording medium such as a hard disk, or solid-state Flash memory such as EEPROM, a 'memory stick'/'thumb drive', solid-state hard drive, etc. The carrier may be an electrical or optical signal which may be transmitted via an electrical or an optical cable or by radio or other means.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A device for marking a moulded form with patterning comprising:
   a marking module locatable in a mould, the marking module comprising:
      a multi-layered printed circuit board; and
      a plurality of phase change actuators, each phase change actuator being housed in a cell defined in the multi-layered printed circuit board,
   wherein each phase change actuator comprises:
      a sealed vertical tubular or cylindrical chamber containing a phase change material in the marking; and
      a heating element contiguous with a vertical sidewall of the vertical tubular or cylindrical chamber,
   wherein a first end of each phase change actuator is sealed by a flexible membrane that is configured to be displaced by the corresponding phase change material during phase transitions.

2. The device as claimed in claim 1, wherein the heating element comprises a sleeve.

3. The device as claimed in claim 2, wherein the sleeve comprises a substantially cylindrical sleeve.

4. The device as claimed in claim 1, wherein the heating element comprises a resistive heating element.

5. The device as claimed in claim 4, wherein the resistive heating element comprises a cured carbon/polymer material.

6. The device as claimed in claim 1, wherein the heating element comprises a coil.

7. The device as claimed in claim 1, wherein each phase change actuator further comprises a vertical heat conductor configured to conduct heat from the heating element to the first end of the each phase change actuator.

8. The device as claimed in claim 1, wherein the phase change material comprises a pure unloaded phase change material.

9. The device as claimed in claim 1, wherein the multi-layered printed circuit board comprises electrodes for the heating element.

10. The device as claimed in claim 9, wherein the multi-layered printed circuit board comprises electrical conductors for the electrodes.

11. The device as claimed in claim 1, wherein the flexible membrane comprises a protective membrane that is configured to seal an array of phase change actuators comprising the plurality of phase change actuators.

12. The device as claimed in claim 1, wherein the flexible membrane comprises an elastomeric or polymeric material.

13. The device as claimed in claim 12, wherein the elastomeric or polymeric material comprises a room temperature vulcanizing silicone adhesive.

14. The device as claimed in claim 1, wherein the device further comprises a controller communicable with the marking module.

15. The device as claimed in claim 14, wherein the controller is wirelessly communicable with the marking module.

16. The device as claimed in claim 1, wherein the marking module further comprises a mould recognizer to recognize individual moulds.

17. The device as claimed in claim 16, wherein the mould recognizer comprises a mechanical keying on the marking module responsive to the mould.

18. The device as claimed in claim 16, wherein the mould recognizer comprises at least one switch on the marking module responsive to a mechanical keying on the mould.

19. The device as claimed in claim 16, wherein the mould recognizer comprises an RFID chip reader on the marking module responsive to an RFID chip on the mould.

20. A phase change actuator in a matrix of phase change actuators, comprising:
   a sealed tubular or cylindrical chamber formed in a cell defined in a printed circuit board;
   a phase change material provided within the tubular or cylindrical chamber;
   a flexible membrane configured to seal a first end of the tubular or cylindrical chamber, the flexible membrane being further configured to seal one end of each phase change actuator in the matrix of phase change actuators; and a heating element provided in or contiguous with a vertical sidewall that encloses the tubular or cylindrical chamber, the heating element being coupled to connectors provided on the printed circuit board.

21. The phase change actuator of claim 20, wherein the heating element comprises a vertical resistive heater coil formed as a coiled groove cut into the vertical sidewall.

* * * * *